United States Patent [19]

Rehbein

[11] 4,269,220
[45] May 26, 1981

[54] TANK VALVE MOUNTING ARRANGEMENT
[75] Inventor: Richard E. Rehbein, Valparaiso, Ind.
[73] Assignee: Pullman Incorporated, Chicago, Ill.
[21] Appl. No.: 74,584
[22] Filed: Sep. 12, 1979
[51] Int. Cl.³ ............................................. F16K 27/03
[52] U.S. Cl. ..................................... 137/350; 251/144
[58] Field of Search ................. 251/144; 137/347, 350

[56]       References Cited
       U.S. PATENT DOCUMENTS

| 1,556,270 | 10/1925 | Welle | 251/144 X |
| 1,784,460 | 12/1930 | McBride | 251/144 X |
| 4,180,242 | 12/1979 | Reedy | 251/144 |
| 4,184,663 | 1/1980 | Rollins et al. | 251/144 |
| 4,187,881 | 2/1980 | Kull | 251/144 |
| 4,198,032 | 4/1980 | Hillstead et al. | 251/144 |

FOREIGN PATENT DOCUMENTS 905071  9/1962  United Kingdom ............ 251/144

Primary Examiner—William R. Cline
Attorney, Agent, or Firm—Richard J. Myers

[57]       ABSTRACT

A valve mounting flange connected over the outlet of a railway car tank includes a body having a tapered skirt which protects a release valve and other associated mechanisms against breakage which could result in rupture of the tank shell.

11 Claims, 4 Drawing Figures

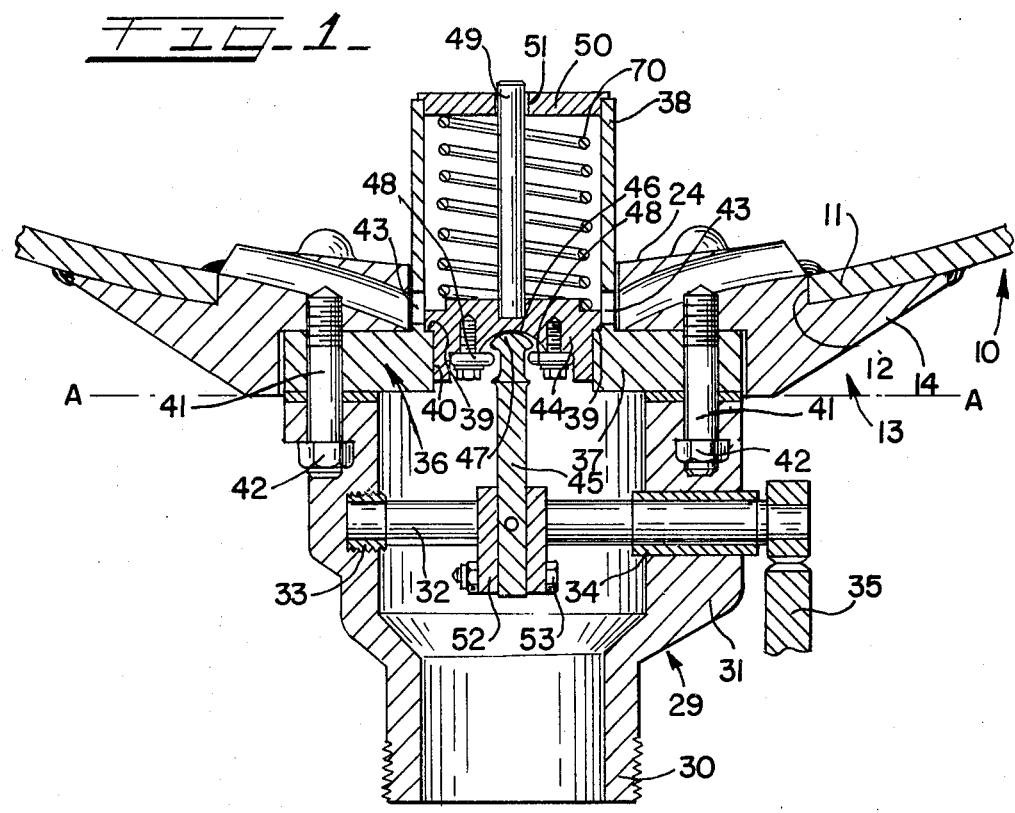
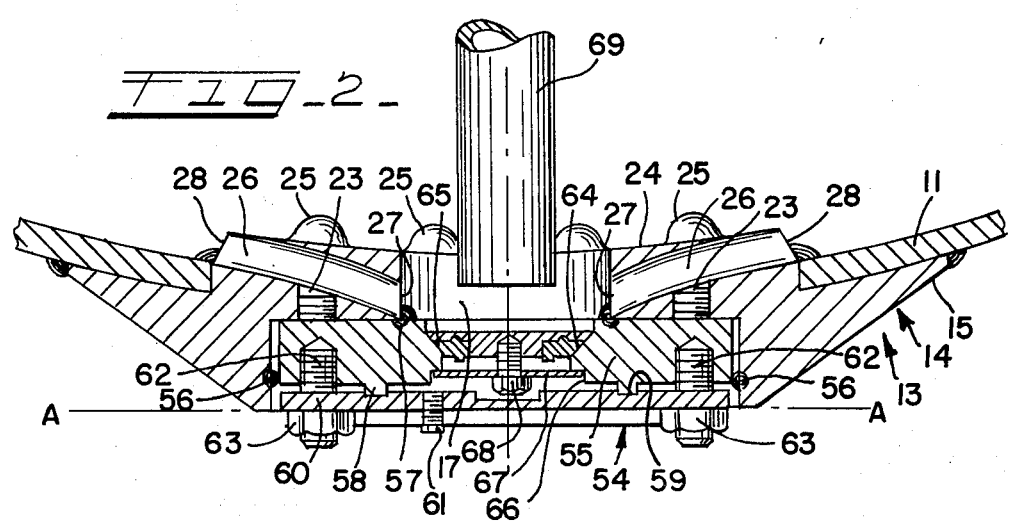

TANK VALVE MOUNTING ARRANGEMENT

BACKGROUND OF THE INVENTION

1. Field of the Invention

The present invention relates to a railway tank car and more specifically to a protective mounting flange secured over the discharge opening of the tank which includes a valving structure.

2. Description of the Prior Art

U.S. Pat. Nos. disclosing valve outlet structures include 3,209,675 patented Oct. 5, 1965, 3,212,824 Oct. 19, 1965 and Pat. No. 1,150,586 Aug. 17, 1915. The latter patent is of particular interest in that it discloses an outlet valve which is surrounded by means of a flanged bracket disposed over the outlet valve of a tank car. The present invention is an improvement over the latter patent in that it discloses a valve mounting flange of a particularly novel design which contains the valve arrangement and is so shaped and constructed that it will protect the former against breakage in the event of accidental damage.

SUMMARY OF THE INVENTION

A railway tank car having a lower cutout portion has connected thereto a flanged valve mounting arrangement. The arrangement includes a dish shaped or cylindrical body having an annular undercut in the upper edge thereof which is welded to and complemental with the cutout portion of the tank shell. The body further includes an outer cylindrical tapering surface which is of inverted frusto-conical shape. The body includes a lower enlarged diameter opening which is in communication with a smaller central vertical opening facing the interior of the tank shell. The flanged body includes circumferentially spaced and radially extending drain openings which communicate with the smaller diameter opening of the tank valve and its valving structure. The mounting flange also is adapted to contain in recessed fashion a washout nozzle arrangement utilized in cars carrying acids and the like.

BRIEF DESCRIPTION OF THE DRAWINGS

FIG. 1 is a cross-sectional view through a portion of a railway tank car disclosing an outlet flange arrangement and valve assembly;

FIG. 2 is a view similar to FIG. 1 disclosing another form of valve arrangement within a mounting flange;

PREFERRED EMBODIMENT OF THE INVENTION

Figure 3:
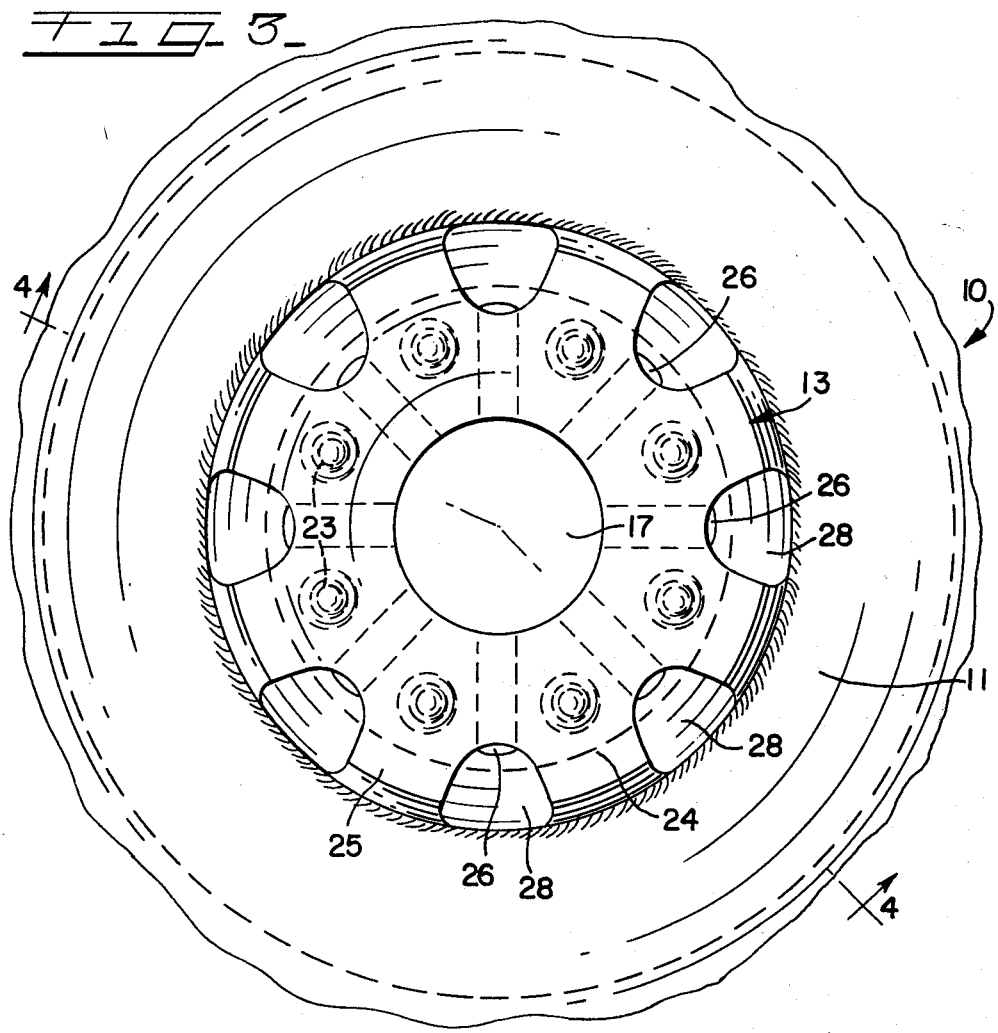
FIG. 3 is a plan view of a mounting flange shown connected to the tank shell of a railway car tank.

Referring to the drawings, a tank of conventional design carried by railway trucks (not disclosed) includes an inner tank portion or shell 11 having a cutout opening 12 within which is mounted a valve mounting flange or arrangement 13. The mounting flange 13 comprises a cylindrical body or skirt 14 having an inverted frusto-conical tapered outer surface 15 sloping downwardly and inwardly extending into a large vertical opening or bore 16. The body or skirt 14 also includes a smaller than opening 16 diameter opening 17 opening inwardly into the tank shell 10. The smaller diameter opening 17 is concentric with and in communication with the larger opening or cut-out portion 16.

Figure 4:
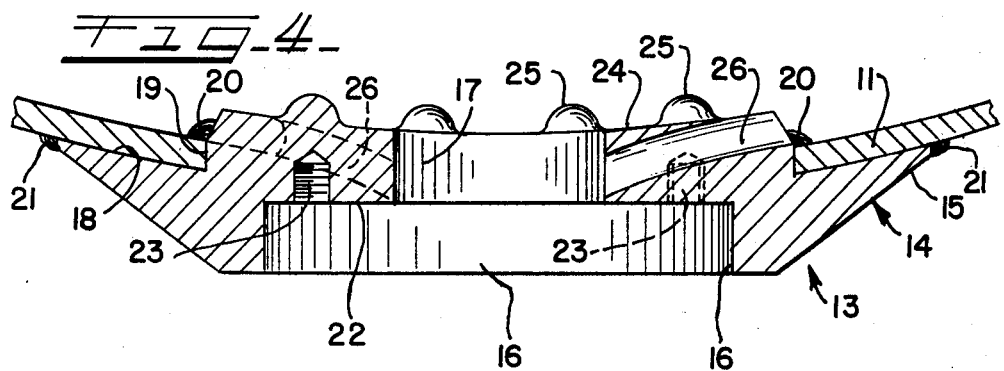
FIG. 4 is a cross-sectional view taken substantially along the line 4—4 of FIG. 3.

As best shown in FIG. 4 portion 18 includes a cylindrical vertical wall 19 forming one end of the undercut portion within which the adjacent or contiguous portions of the tank shell are secured by means of welds 20. The uppermost outer ends of the skirt 14 also are connected to the outer surfaces of the tank shell 10 by means of welds 21. The lower portion of the skirt or body 14 includes a recessed horizontal cylindrical wall 22 forming the upper end of the large opening 16. The opening 16 is in communication with a concentric smaller diameter opening 17 communicating directly with the interior of the tank shell 10. The skirt 14 also includes a plurality of radially spaced tapped openings 23 opening outwardly into the opening 16. An upper annular surface 24 on the body or skirt 14 is provided with a plurality of reinforcing bosses 25 spaced radially outwardly of the opening 17 and being circumferentially disposed. The body also includes the plurality of radially extending arcuate passages or tunnels 26 provided with inner openings 27 communicating with the smaller diameter opening 17. The passages 26 are in communication with the interior of the tank shell 10 by means of openings 28, best shown in FIG. 3.

FIG. 1 discloses an improved valve 29 having at its lower end a threaded outlet structure 30 provided in a valve body 31. The valve body 31 supports a shaft 32, in bearings 33 and 34, the shaft being rotatable by means of a handle 35. The valve body 31 supports an upper sleeve member 36 having at its lower end a cylindrical flange 37 which is integral with a tubular upstanding portion 38 extending inwardly into the tank shell 10. The sleeve 37 is also provided with an inwardly projecting shoulder 39 providing a bore 40. Threaded studs or screws 41 are threaded into the openings 23 and nuts 42 threaded onto the threaded screws 41 support the valve body 31 rigidly on the valve mounting flange 13. The valve member 44 is seated on the annular shoulder 39 and is adapted to be reciprocated vertically within the tubular portion 38 between closed and open positions. During the open position the openings 43 in the tubular member 38 communicate with the drain openings 26 for discharging material from the tank shell outwardly through the threaded outlet 30. A valve actuator or plunger is designated at 45. The valve member includes a lower arcuate surface 46 which is engaged by the plunger end 47 of the valve actuator 45. Retainers members 48 are screwed into the valve member 44 to retain the plunger end 47 within the recessed arcuate portion 46. The valve member 44 also has connected thereto a vertically extending guide pin 49 which extends through opening 51 in a guide disk 50 rigidly secured to the upper ends of the tubular member 38. A coil spring 70 seated upon the valve member 44 urges the same to the closed position indicated in FIG. 1. The valve actuator 45 is pivotally connected to the end of an arm 52 by means of screw and nut fastener 53, the said arm 52 being rigidly supported for rotating movement with the shaft 32 when the handle 35 is actuated. The valve mechanism is conventional in that upon rotation of the handle 35 the arm 52 is rotated which in turn causes upward movement of the actuator 45 with the arcuate end 47 pushing upwardly on the valve member 44 to open the valve. Upon release of the handle 35 the valve spring 70 again returns the valve member 44 to the closed position.

In FIG. 2 the same mounting flange arrangement is disclosed but instead of the conventional valve member, a structure is provided within the opening which in the industry is known as a washout nozzle. The structure herein includes a nozzle arrangement 54 which includes a cylindrical flange 55 welded as indicated at 56, within the opening 16 to the frusto-conical body 14. The flange 55 which is of cylindrical shape is welded, as indicated in 57, to the conical body to support the same within the skirt 14. The flange 55 includes a downwardly projecting ring 58 seated within an annular groove 59 of a closure plate 60. The closure plate 60 is secured to the flange 55 by means of threaded studs 62 extending into the flange 55, and is securely fastened thereto by means of fasteners 63. The closure plate 60 also is provided with a threaded plug 61. The flange 55 also includes an upper tapering valve seat 64 which is closed by a valve plate 65. An under-cut annular shoulder 66 has seated therein a retainer disk 67 which includes a fastener 68 threaded into the valve plug 65 for maintaining the same in the closed position shown. A siphon pipe 69 is supported within the tank shell 10 and is utilized in the flushing of the interior as desired.

In the design shown in FIG. 1 a conventional valve arrangement is disclosed. In this arrangement the flange 37 and related valve 44 maintain the tank shell in sealed relation, the valve being movable by means of the handle 35, shaft 32, and actuator plunger 45 to an open position for discharging the materials from within the tank. In the event of an accident occurring when a force accidentally is applied to the lower portion of the tank, the portions of the valve mechanism below the shear line A would possibly be damaged. Forces applied against the surface 14 would of course be deflected downwardly, and away from the valve mechanism, thus minimizing any damage, and the main valve arrangement would remain free of any damage and remain closed despite the severity of the accident to which the tank shell is subjected. Thus puncture of the shell itself or destruction of the closure portion of the valve would not occur because the critical and essential parts are contained within the recess provided within the valve mounting flange. In FIG. 2 the washout valve arrangement, which is conventional in the art, is completely recessed within the larger opening and thus damage cannot occur since in the event of accident the tapering surface of the skirt 14 will deflect any forces away from the mounting flange thus assuring the integrity of the arrangement. The washout type of valve design is particularly useful in the cleaning of acid transporting tank cars which must be cleaned at periodic intervals. Thus it is apparent that the flange protects the bottom of the valve or washout nozzle whichever is mounted on the particular flange.

What is claimed is:

1. In a lading valve assembly for a tank car having a shell with a bottom cut-out opening, the improvement of a valve mounting arrangement comprising:
    a valve mounting flange member having a one-piece body including vertical opening means,
    said body including an outer portion disposed over and closing said cut-out opening,
    means connecting said body to said tank shell to seal said cut-out opening,
    said outer portion having an outer surface tapering downwardly from said shell and inwardly toward said vertical opening means, and
    said body having a raised portion extending into said shell with radial tunnel means therein communicating with the tank and said vertical opening means.

2. The mounting arrangement in accordance with claim 1, said body being of frusto-conical shape and being connected to said shell in inverted relation.

3. The mounting arrangement in accordance with claim 2, said vertical opening means comprising a center opening communicating directly with the interior of said tank shell.

4. The mounting arrangement in accordance with claim 1, said tunnel means in said raised portion being aligned with the interior bottom side of the shell and serving as drains.

5. The mounting arrangement in accordance with claim 4, said body having an annular upper undercut portion complemental to and receiving portions of said shell contiguous to said cut-out opening.

6. The mounting arrangement in accordance with claim 5, said body having a cylindrical outer portion welded to an outer portion of said shell, and said shell having an inner portion welded to the undercut portion of said body.

7. The mounting arrangement in accordance with claim 1, including outlet means adapted to receive an associated valve assembly and mounted within said vertical opening means and being substantially recessed therein.

8. The mounting arrangement in accordance with claim 1, said vertical opening means including a first upper opening in said body and
    a second large opening in said body concentric with said first opening and communicating therewith.

9. The mounting arrangement in accordance with claim 1, said tunnel means comprising a plurality of drain passages radially located as to said opening means.

10. A valve mounting arrangement located within an opening of a railway tank car shell and comprising:
    a one-piece valve mounting flange member attached to said tank shell enclosing said opening,
    said flange member having a central valve-receiving opening means, and
    said flange being generally of a frusto-conical shape forming a skid tapering downwardly from said tank shell,
    said opening means including a center vertical round bore and a plurality of tunnels extending radially therefrom and each tunnel having an outlet opening at an opposite end thereof facing the car interior, and
    said vertical round bore facing the interior of the tank shell in its upper end and the bottom end thereof facing and merging with a flange center cut-out portion of a larger concentric diameter than said bore.

11. The mounting arrangement in accordance with claim 10,
    said skid having an outer peripheral edge portion underlying and rigidly attached to the shell away from said shell opening, and
    said flange having a cylinder-shaped portion projecting inwardly into the tank shell through said shell opening and extending upwardly from said skid, and said cylinder-shaped portion having its outer edge rigidly connected to a shell opening edge, and
    said cylinder-shaped portion comprising a vertical bore and a plurality of tunnels inclined toward and merging with said bore thereby providing a drain between the car interior space and said bore.

* * * * *